United States Patent Office 3,677,996
Patented July 18, 1972

---

3,677,996
ROOM TEMPERATURE VULCANIZABLE SILICONE RUBBER CONTAINING POLYGLYCOL DERIVATIVE
Wolfgang Kaiser, Adrian, Mich., and Siegfried Nitzsche, Ernst Wohlfarth, and Paul Hittmair, Burghausen, Upper Bavaria, Germany, assignor to Wacker-Chemie G.m.b.H., Munich, Bavaria, Germany
No Drawing. Filed Mar. 3, 1971, Ser. No. 120,679
Int. Cl. C08g 31/02
U.S. Cl. 260—46.5 G   3 Claims

ABSTRACT OF THE DISCLOSURE

This invention relates to room-temperature vulcanizing siloxane elastomers characterized in that, besides a known crosslinking agent which contains a nitrogen atom and three hydrolyzable groups, the siloxane is mixed with a polyglycol which imparts a low modulus elasticity to the cured polymer and allows for stable polymers in the uncured state.

---

This invention relates to the incorporation of specific compounds which display at least one nitrogen atom and at least three hydrolyzable groups per molecule to diorganopolysiloxanes which may be stored upon exclusion of water, and which are cured to elastomers at room temperature upon the addition of water with silicon compounds. Exceptionally stable materials, which will result in elastomers with a low modulus of elasticity, are obtained with the method of the present invention.

In a discussion of organopolysiloxane materials which are cured to elastomers at room temperature, distinction must be made between those which are prepared more or less immediately before use by mixing at least 2 components and those which are cured in the air from the effects of the water vapor contained therein without any other additives, i.e., between the so-called "two-component" and the so-called "one-component" systems. The present invention relates to methods of preparing materials of the latter type, i.e., which relates to a method of preparing organopolysiloxane materials which will cure to elastomers at room temperature upon the admission of water.

Materials which may be stored with the exclusion of water and which will cure to elastomers at room temperature upon addition of water and which are prepared by mixing diorganopolysiloxanes displaying reactive endgroups, with silicon compounds displaying at least one nitrogen atom and at least three hydrolyzable groups per molecule have been known for some time (cf. for instance, German Auslegeschrift 1,120,690; 1,191,571; 1,223,546; 1,224,039; 1,230,564; 1,240,664; 1,255,924 and Belgium Pat. 614,394). When compared with previously known materials which can be stored upon exclusion of water and which will cure to elastomers at room temperature and which are composed of diorganopolysiloxanes displaying reactive endgroups and silicon compounds displaying at least three hydrolyzable groups per molecule such as methyltriacetoxysilane, for instance, the materials of our invention have the advantage that no highly corrosive materials are released during the curing.

The materials of the prior art which can be stored upon exclusion of water and which will cure to elastomers upon addition of water at room temperature and which are prepared by mixing diorganopolysiloxanes displaying reactive endgroups with silicon compounds displaying at least one nitrogen atom and at least three hydrolyzable groups per molecule have the disadvantage that they are not stable enough for many applications, especially for sealing perpendicular joints which are prepared after prefabricated construction parts are mounted, i.e., they will run off of substrates covered with them or run out of the joints before they cure to elastomers if they do not contain relatively large quantities of calcium carbonate having a particle size of less than 4 microns, fumed silica and/or alkali or earth alkali aluminum silicates with molecular sieve properties as fillers. The one-component systems which have been known, containing very finely divided calcium carbonate or the fumed silicon dioxide in large quantities, however, have the disadvantage that they result in elastomers of unsatisfactory mechanical stability, that is, they display a consistency which is similar to window putty so that they cannot be put to use by simply pressing them from a tube without exerting much strength but can only be extruded from a special extrusion apparatus or troweled with a spatula. Single component systems which contain fumed silica and alkali or earth alkali aluminum silicates having molecular sieve properties have the disadvantage that in order to get good results the silicon compounds displaying at least three hydrolyzable groups per molecule must be added to the mixture of the remaining components portionwise. Further, those materials cannot be stored very long when the silicon compounds containing at least one nitrogen atom and at least three hydrolyzable groups per molecule are those wherein one of the hydrolyzable groups is an oxime group.

The one-component systems prepared according to the present invention, on the other hand, are stable even when they contain triorganosiloxy endblocked diorganopolysiloxanes as softeners. The consistency is such that they can be worked easily with the special extrusion apparatus or with a spatula and can be pressed from a tube even more readily than the known one-component systems which contain alkali or the earth alkali aluminum silicates having molecular sieve properties. The materials prepared according to the present invention will keep excellently, even those silicon compounds displaying at least one nitrogen atom and at least three hydrolyzable groups per molecule, wherein at least one of the hydrolyzable groups is an oxime group. The materials prepared according to the present invention will yield elastomers with a surprisingly low module of elasticity, even when there are only a few or no triorganosiloxy endblocked diorganopolysiloxanes as softeners.

The subject of the invention is a method of preparing materials, which can be stored at room temperature upon exclusion of water and which will cure to elastomers at room temperature upon contact with water, by mixing diorganopolysiloxanes displaying reactive endgroups with silicon compounds displaying at least one nitrogen atom and at least three hydrolyzable groups per molecule, reinforcing fillers and at least one material, separate from the fillers and the condensation catalysts, which is a polyglycol. The polyglycol can be etherified or esterified, i.e., the glycol can have an ether endblock or an ester endblock and still be within the scope of this invention.

The diorganopolysiloxanes displaying reactive endgroups which can be used within the framework of the present invention can be the same ones which are commonly used for preparing materials which may be stored upon exclusion of water and which will cure to elastomers upon admission of water, based on diorganopolysiloxanes. The diorganopolysiloxanes which are used for preparing such materials and which are also very suitable for the present invention can be given by the general formula

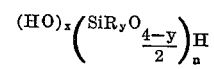

In this formula, R is a monovalent hydrocarbon radical which may be substituted, $x$ has an average of 0.99 to 1.09, $y$ has an average of 1.99 to 2.01, the sum of $x+y$ is 3 and $n$ is a whole number of at least 3, preferably at least 50. The hydroxy groups, if desired, can be replaced at least in part by other reactive endgroups such as a radical of the general formula RNH— where R is as above defined, oxime groups, hydrogen atoms, alkoxy or alkoxy-alkoxy radicals, as well as by a radical of the formula $CH_3OCH_2CH_2O$—. The diorganopolysiloxanes displaying reactive endgroups can contain siloxane units of other degrees of substitution in addition to the diorganosiloxane units in small quantities as is shown by the average value of 1.99 to 2.01 for $y$.

Examples of hydrocarbon radicals R are alkyl radicals such as methyl, ethyl, isopropyl and octadecyl; alkenyl radicals such as vinyl and allyl; cycloaliphatic hydrocarbon radicals such as cyclopentyl, cyclohexyl, cyclohexenyl and methylcyclohexyl; aryl radicals such as phenyl and xenyl; aralkyl radicals such as benzyl, beta-phenylethyl and beta-phenylpropyl; as well as alkanyl radicals such as tolyl.

The preferred substituted hydrocarbon radicals R are halogenated aryl radicals such as chlorophenyl radicals; perfluoroalkyl ether radicals such as 3,3,3-trifluoropropyl radicals and cyanoalkyl radicals such as beta-cyanoethyl radicals.

Because of the ready availability, preferably at least 50% of the number of R radicals are methyl radicals, the remaining R radicals which can be present are preferably phenyl and/or vinyl.

The R radicals on the individual silicon atoms can be alike or different. The diorganopolysiloxanes displaying reactive groups may be homopolymers, mixtures of various homopolymers, copolymers, mixtures of various copolymers always of the same degree of polymerization.

The viscosity of the diorganopolysiloxanes is preferably between 100 to 500,000 cs. at 25° C.

The silicon compounds which display at least one nitrogen atom and at least three hydrolyzable groups per molecule which are useful in this invention, are prior art materials and are well known from the heretofore cited references.

Since the preparation of stable, highly viscous, smooth materials which contain silicon compounds having at least three hydrolyzable groups and which also contain at least one oxime group is not possible in any other way, the method of the present invention is of the greatest significance. An example of such silicon compounds containing at least one nitrogen atom and at least three hydrolyzable groups per molecule wherein at least one of the hydrolyzable groups is an oxime group are silanes of the general formula $R_aSi(ON=X)_{4-a}$ wherein R is as above defined, X is an $RR^1C=$ group wherein R is as above defined and $R^1$ is hydrogen or is the same as R or an $R^2C=$ group wherein $R^2$ is a divalent hydrocarbon radical which can be substituted and $a$ is 0 or 1, and their partial hydrolyzates. Also are silanes of the general formula $R_aSi(ON=X)_b(NRR^3)_c$ wherein R, X and $a$ are as defined above, $R^3$ is hydrogen or is the same as R, $b$ and $c$ have an average value of at least 0.5, the sum of $b+c$ is 3 or 4 and the sum of $a+b+c$ is 4, and their partial hydrolyzates or other oligomers.

The silanes of the formula $R_aSi(ON=X)_b(NRR^3)_c$ can, for instance, be prepared by reacting halosilanes, preferably in the presence of an acid acceptor material such as triethylamine pyridine or alpha-picoline, with oximes of the formula $X=NOH$ wherein X is as above defined, and primary or secondary amines of the formula $R^3RNH$ wherein R and $R^3$ are as defined above, at room temperature, preferably in an inert solvent such as toluene and with the exclusion of water. For the reaction of halosilanes with oxime and for the reaction of halosilanes with amines, the known procedures can be used.

Other examples of silicon compounds displaying at least one nitrogen atom and at least three hydrolyzable groups per molecule are silanes of the general formula $R_aSi(NRR^3)_{4-a}$ wherein R, $R_3$ and $a$ are as defined above and their oligomers. A very important example for mixtures of silicon compounds containing at least one nitrogen atom and at least three hydrolyzable groups per molecule wherein at least one of the hydrolyzable groups is an oxime group and other silicon compounds containing at least three hydrolyzable groups are mixtures of silanes of the formula $R_aSi(ON=X)_{4-a}$ and silanes of the formula $R_aSi(NRR^3)_{4-a}$. Other, but less preferred examples of silicon compounds containing at least one nitrogen atom and at least three hydrolyzable groups per molecule are silanes of the general formula $$R_aSi(ONR_2)_{4-a}$$

and

wherein R and $R^2$ as well as $a$ are as defined above, silanes of the general formula

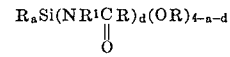

wherein R, $R^1$ and $a$ are as defined above and $d$ is at least 1, silanes of the general formula $R_aSi(NCO)_{4-a}$, wherein R and $a$ are as above defined, silanes of the general formula $R_aSi(NCS)_{4-a}$, wherein R and $a$ are as above defined, furthermore, silanes of the general formula

wherein $R^4$ is an alkoxy group or hydrogen and E is an amino group or substituted amino group or a monovalent radical, containing at least one amino group or substituted amino group on the silicon atom bonded across carbon or nitrogen, or their partial hydrolyzates, and silanes of the general formula $R^5_fSiZ_{4-f}$ wherein $R^5$ is hydrogen, an alkoxy group or is an defined under R, Z is a monovalent hydrocarbon radical bonded to the silicon atom across oxygen and contains at least one amino group or substituted amino group and $f$ equals 0, 1, 2 or 3, wherein $f$ is not more than 1 when $R^5$ is the same as R, and their partial hydrolyzates. Other examples for silicon compounds which contain at least one nitrogen atom and at least 3 hydrolyzable groups per molecule are organopolysiloxanes of the general formula $R_3Si(OSiR_2)_mOSi(NRR^3)_e(ON=X)_{3-e}$ wherein R, $R^3$ and X are as above defined, $m$ is 0 or an integer of 1 to 20, and $e$ is 0, 1, 2 or 3.

Individual examples for the preferred silicon compounds which contain one nitrogen atom and at least three hydrolyzable groups per molecule are silanes of the formulae $CH_3Si\{ON=C(CH_3)C_2H_5\}_3$ and $$CH_3Si\{ON=C(CH_3)_2\}_3$$

Individual examples for preferred silicon compounds which contain at least one nitrogen atom and at least three hydrolyzable groups per molecule are silanes of the formula $CH_3Si\{ON=C(CH_3)(C_2H_5)\}_2NHC_6H_{11}$ and a mixture of one part by weight methyltris(cyclohexylamino)silane and 2 parts by weight of the silane of the formula $CH_3Si\{ON=C(CH_3)_2\}_3$ as well as a mixture of 2 parts by weight of methyltris(cyclohexylamino)silane, and 3 parts by weight of the silane of the formula $$CH_3Si\{ON=C(CH_3)C_2H_5\}_3$$

Additional examples of preferred silicon compounds which contain one nitrogen atom and at least three hydrolyzable groups per molecule are methyltris(n-butylamino)silane and methyltris(cyclohexylamino)silane.

Other examples of silicon compounds which contain at least one nitrogen atom and at least three hydrolyzable groups per molecule are methyltri(diethylaminoxy)silane, ethyltri(n-piperidinoxy)silane, the silane of the formula

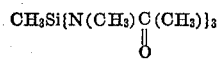

the silane of the formula

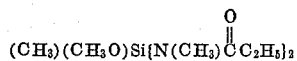

methyltriisocyanatosilane, methyltriisothiocyanatosilane and the organosiloxane of the formula $$(CH_3)_3SiOSi\{ON{=}C(CH_3)_2\}_3$$

furthermore, n - aminoethylaminopropyltriethoxysilane and (aminobutoxy) triisopropoxysilane.

The silicon compounds which contain at least one nitrogen and at least three hydrolyzable groups per molecule are best used in amounts so that at least one mole of these compounds is present per gram equivalent of the reactive endgroups in the diorganopolysiloxanes containing such endgroups. In practice, 0.2 to 15 percent by weight, most commonly 1 to 10 percent by weight, calculated on the total weight of the total mass of silicon compounds which contain one nitrogen atom and at least three hydrolyzable groups are often used.

The reinforcing fillers, namely fillers with a surface of more than 50 m.²/g. and which have been used heretofore, can be used for preparing the organopolysiloxane elastomers. Examples of such fillers are primarily fumed silicon dioxide, silicon dioxide aerogel and precipitated silicon dioxide with a large surface area. If desired, however, other fillers with a surface of more than 50 m.²/g. can be used instead of the silicon dioxide types or can be used together with these silicon dioxide types. Examples of such fillers are metal oxides such as titaniumdioxide, ferric oxide, aluminum oxide and zinc oxide insofar as they display a surface of at least 50 m.²/g. All these fillers can be hydrophobized, that is, they can be rendered organophilic by treatment with trimethylmethoxysilane.

The reinforcing fillers are preferably incorporated in amounts of 1 to 15 percent by weight calculated on the total weight of the organosilicon compounds which are present in total material. If more than 15% by weight calculated on the total weight of all the organosilicon compounds present in the total material of reinforcing fillers is incorporated, the materials will not be smooth and will result in elastomers with an undesired high modulus elasticity.

The polyglycols which may be etherified or esterified are preferably incorporated in amounts of 0.5 to 30% by weight, especially 0.5 to 20% by weight calculated on the weight of the diorganopolysiloxanes displaying the reactive endgroups.

Excellent results are obtained with polyglycol ethers which are readily available and which are of the general formula $RO\{(CHR^6)_pO\}_sH$. In this formula, R is as above defined, $R^6$ is hydrogen or an alkyl radical, $p$ is a whole number with a value of 2 to 5 and $s$ is a whole number with a value of 2 to 100, preferably 4 to 50.

Examples of hydrocarbon radicals R in the polyglycol ethers of the above formula are, in addition to R discussed above, hydrocarbon radicals, lauryl-, myristyl-, cetyl-, stearyl-, oleyl-, octylphenyl-, nonyl-, trimethylnonylphenyl-, tributylphenyl- and dodecylphenyl-radicals. If $R^6$ is not hydrogen, then it is preferably a methyl radical. Examples of polyglycols which can also be used within the framework of the present invention are those polypropyleneoxide-polyethyleneoxide condensation products known under their registered trademark "Pluronics®."

The etherified or esterified polyglycols also include the organopolysiloxane-polyoxyalkylene copolymers. Examples of such copolymers are those of the general formulae (I) $R_3Si\{OSi(R)A\}_{p'}OSiR_3$, (II) $A\{OSi(R)A\}_{p'}OA$ and (III) $A(R)_2Si\{OSi(R)A\}_{p'}OSi(R)_2A$ wherein R is as defined above, mostly it is a methyl radical, $p'$ is a whole number of 1 to 50 and the A radical is the same or different radical of the general formula $$-\{(CHR^6)_pO\}_sR^7$$

where $R^6$, $p$ and $s$ are as defined above and $R^7$ is hydrogen, a monovalent hydrocarbon radical, acyl radical, triorganosilyl radical, diorgano(hydrocarbonoxy)silyl radical, such as the radical of the formula $$-Si(CH_3)_2OC_2H_5$$

or a radical of the formula $\{Si(R)AO\}_{p'}B$ wherein R, A and $p'$ are as above defined and B is $SiR_3$ or A or $OSi(R)_2A$, and copolymers, especially block copolymers, composed of diorganosiloxane units and units of the general formula $$Si\{(O)_gA\}_iR_h O_{\frac{4-i-h}{2}}$$

wherein A and R are as above defined, $g$ is 0 or 1, $i$ is 1, 2 or 3, $h$ is 0, 1 or 2 and the sum of $h+i$ is 1 to 3 and, if desired, in addition to units of the general $$R_{h'}(RO)_{i'}SiO_{\frac{4-h'-i'}{2}}$$

wherein R is as above defined and $h'$ is 0, 1 or 3, $i'$ is 0, 1, 2 or 3 and the sum of $i'+h'$ is 0, 1, 2 or 3.

Probably the best respresentative of copolymers of the latter type known up to now is the compound of the formula $$C_2H_5Si\{O(Si(CH_3)_2O)_6(C_nH_{2n'}O)_{s'}C_4H_9\}_3$$

wherein $(C_nH_{2n'}O)_{s'}$ consists of about 17 oxyethylene and about 13 oxypropylene units.

The most preferred polyglycol derivatives for the framework of the present invention include the latter type of copolymer and are of the general formula $$A(R)_2Si\{OSi(R)_2\}_{p'}OSi(R_2)A$$

The preparation of the organopolysiloxane-polyoxyalkylene copolymers is generally known. It can be carried out, for example, by attaching unsaturated polyglycolethers to organopolysiloxanes containing Si-bonded hydrogen in the presence of platinum catalysts.

In addition to the diorganopolysiloxanes containing reactive endgroups, the silicon compounds which contain at least one nitrogen atom and at least three hydrolyzable groups per molecule, reinforcing fillers and polyglycols, other materials can also be used for the method of the present invention. Examples of materials which can be used as further additives within the framework of the present invention are non-reinforcing fillers, pigments, soluble dyes, organopolysiloxane resins, pure organic resins, such as polyvinylchloride powder, corrosion inhibitors, aromatics, oxidation inhibitors, heat stabilizers, solvents, condensation catalysts such as dibutyltin salts of aliphatic carboxylic acids which are branched in alpha position to the carboxyl group and which display 9 to 11 carbon atoms and organosiloxytitanium compounds, means for improving adhesion of the elastomers prepared from these materials to the substrates, as well as softeners such as fluid trimethylsiloxy endblocked dimethylpolysiloxane.

If some of the SiC-bonded organic radicals which are present in the organosilicon compounds used within the framework of the present invention are those with aliphatic multiple bonds, especially vinyl groups, the concurrent use of organic peroxy compounds in amounts of 0.01 to 5% by weight calculated on the weight of the diorganopolysiloxanes can be favorable.

Examples of non-reinforcing fillers, i.e., fillers with a surface of less than 50 m.²/g. are quartz flour, diatomaceous earth, calcium silicate, zirconium silicate, calcium carbonate with a particle size of more than 4 microns and calcinated aluminum silicate.

Fibrous fillers such as asbestos, glass fibers or organic fibers can also be used. Obviously, mixtures of various non-reinforcing fillers can be used.

In the method of the present invention, all components and starting products of the materials to be prepared can be mixed in any desired succession. This mixing is preferably done at room temperature and under the exclusion of water.

The materials prepared according to the present invention can be stored in the absence of water. They will cure at room temperature from the effects of water, for which the normal water content of air is sufficient. Curing can also be carried out at higher temperatures than room temperature or at lower temperatures. Curing can, if desired, also be carried out at higher temperatures than room temperature or at lower temperatures, for instance, at 5° C. in the presence of water which exceeds the normal water content of the air.

The materials prepared according to the present invention are not only suitable for sealing joints, especially perpendicular joints and similar hollows having a width of 20 to 50 mm. but can be useful in prefabricated construction parts, as well as land-, water- and aircraft. In addition, they are useful for preparing protective coatings and for preparing insulation for electrical conductors.

In the following examples, examination of the materials for stability according to DIN 52,454 and the determination of the modulus of elasticity, breaking elongation and dielectric strength of the elastomers prepared from these materials according to DIN 53,504 Norm III is given.

EXAMPLE 1

200 g. of a dimethylpolysiloxane containing one Si-bonded hydroxyl group in each terminal unit and having a viscosity of 18,800 cp. at 25° C. is first mixed with 50 g. of a trimethylsiloxy endblocked dimethylpolysiloxane having a viscosity of 35 cp. at 25° C., 24 g. silicon dioxide obtained pyrogenically from the gas phase and 20 g. of the organopolysiloxane-polyoxyalkylene block copolymer of the average formula

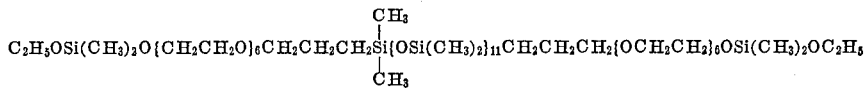

The mixture thus obtained is mixed with 4.5% by weight calculated on its weight of methyltris(cyclohexylamino) silane. A smooth, soft material is obtained which proves to be stable after the above testing and which can be stored in the absence of water. The material is applied to a smooth substrate in a layer 2 mm. thick and then cured in the air to an elastomer having the following properties which were measured eleven days after the curing had begun.

Modulus of elasticity, p.s.i. _____ 31.2
Breaking elongation, percent _____ 500
Dielectric strength, p.s.i. _____ 143.6

EXAMPLE 2

The procedure described in Example 1 is repeated with the alteration that instead of the methyltrisaminosilane, 4.5% by weight of a mixture of 45 parts by volume of the compound of the formula $CH_3Si\{ON=C(CH_3)C_2H_5\}_3$ and 1 part by volume of dibutyltindilaurate was used. A smooth, soft material is obtained which proves to be stable upon the examination described above and which can be stored in the absence of water. The material is applied to a smooth substrate in a layer 2 mm. thick and is cured in the air to an elastomer with the following properties which were measured eleven days after the curing had begun.

Modulus of elasticity, p.s.i. _____ 35.5
Breaking elongation, percent _____ 480
Dielectric strength, p.s.i. _____ 139.4

EXAMPLE 3

(a) 50 parts by weight of a dimethylpolysiloxane displaying one Si-bonded hydroxyl group in each terminal unit having a viscosity of 350,000 cp. at 25° C. are mixed with 15 parts by weight of a dimethylpolysiloxane containing one Si-bonded hydroxyl group in each terminal unit and having a viscosity of 19,000 cp. at 25° C., 35 parts by weight of a trimethylsiloxy endblocked dimethylpolysiloxane having a viscosity of 1,000 cp. at 25° C., 3 parts by weight of a tributylphenyl etherified with a polyethylene glycol consisting of 13 ethyleneoxy units, 7 parts by weight of silicon dioxide obtained pyrogenically from the gas phase and 25 parts by weight of calcinated aluminum silicate and then with 9 parts by weight of a mixture of 3 parts by weight of the silane of the formula

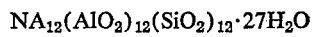

and 2 parts by weight of methyltris(cyclohexylamino) silane as well as 1.5 parts by weight of a 20 weight percent solution of dibutyltindilaurate in toluene. A smooth material is obtained which proves to be stable after the test given above and which can be stored in the absence of water. The material is applied to a smooth substrate in a layer 2 mm. thick and is then cured in the air to an elastomer with the following properties measured 11 days after the curing has begun.

Modulus of elasticity, p.s.i. _____ 71
Breaking elongation, percent _____ 490
Dielectric strength, p.s.i. _____ 284.4

(b) The above procedure was repeated for purposes of comparison. Instead of the 3 parts by weight of polyethylene glycolether added to the 35 parts by weight of the trimethylsiloxy endblocked dimethylpolysiloxane of 1000 cp. at 25° C., which were already present, another 3 parts by weight of the trimethylsiloxy endblocked dimethylpolysiloxane having a viscosity of 1000 cp. at 25° C. were incorporated and of the 25 parts by weight of calcinated aluminum silicate, 1.5 parts by weight of this aluminum silicate was replaced by 1.5 parts by weight of a pulverulent sodium aluminum silicate having molecular sieve properties with a pore diameter of 4 A. (this sodium aluminum silicate had the formula

before the dehydration which was carried out to develop the molecular sieve properties). As soon as the dibutyltindilaurate was mixed in the material, it became very stiff and before it was placed into the container intended for transportation, it began to harden to an elastomer.

That which is claimed is:

1. In a method for preparing a silicone rubber stock which can be stored in the substantial absence of moisture and vulcanizes and cures at room temperature via the reaction between the reactive groups on the base linear siloxane polymer and crosslinking organosilicon material containing at least one nitrogen atom and at least three hydrolyzable groups per molecule, the improvement consisting of incorporating therein 0.5 to 30 percent by weight based on the weight of base linear siloxane polymer present of a polypropyleneoxide-polyethyleneoxide condensation product which is a polyglycol or a polyglycol derivative of the general formula $RO\{(CH^6)_pO\}_sH$ where R is a hydrocarbyl, halogenoaryl, perfluoroalkylethyl or cyanoalkyl radical of less than 19 carbon atoms, $R^6$ is H or alkyl radicals of 1 to 18 carbon atoms, $p$ is 2 to 5 and $s$ is 4 to 50, $R_3Si(OSiRA)_{p'}OSiR_3$, $A(OSiRA)_{p'}OA$, $$AR_2Si(OSiRA)_{p'}OSiR_2A$$

or $AR_2Si(OSiR_2)_{p'}OSiR_2A$ where R is as above defined, $p'$ is 1 to 50 and A is $—\{(CH^6)_pO\}_sR^7$ where $R^6$, $p$ and $s$ are as above defined and $R^7$ is H, hydrocarbyl, acyl, trihydrocarbylsilyl or dihydrocarbylhydrocarbonoxysilyl.

2. The method of claim 1 wherein the polyglycol additive is a polypropyleneoxide-polyethyleneoxide condensation product which is a non-ionic surfactant or a compound of the formula $$C_2H_5Si\{O(Si(CH_3)_2O)_6(C_{m'}H_{2n'}O)s \cdot C_4H_9\}_3$$

where $(C_{n'}H_{2n'}O)_{s'}$ where $n'$ is 2 or 3 and $s'$ is about 30 and consists of about 17 oxyethylene and 13 oxypropylene units.

3. The method of claim 1 wherein the polyglycol is present to the extent of 0.5 to 20 percent by weight based on the weight of the base linear siloxane polymer present.

References Cited

UNITED STATES PATENTS

| | | | |
|---|---|---|---|
| 3,451,964 | 6/1969 | Creamer | 260—37 SB |
| 3,240,731 | 3/1966 | Nitzsche et al. | 260—37 SB X |
| 3,364,160 | 1/1968 | Golitz et al. | 260—37 SB X |
| 3,324,058 | 6/1967 | Scott | 260—37 SB X |

LEWIS T. JACOBS, Primary Examiner

U.S. Cl. X.R.

260—37 SB, 824, 825